US010959211B2

(12) United States Patent
Tang (10) Patent No.: US 10,959,211 B2
(45) Date of Patent: Mar. 23, 2021

(54) DATA PROCESSING METHOD AND DEVICE (71) Applicant: Guangdong OPPO Mobile Telecommunications Corp., Ltd., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/466,007

(22) PCT Filed: Dec. 7, 2016

(86) PCT No.: PCT/CN2016/108895
§ 371 (c)(1),
(2) Date: May 31, 2019

(87) PCT Pub. No.: WO2018/103016
PCT Pub. Date: Jun. 14, 2018

(65) Prior Publication Data
US 2019/0394752 A1 Dec. 26, 2019

(51) Int. Cl.
*H04W 40/24* (2009.01)
*H04W 72/02* (2009.01)
*H04W 72/04* (2009.01)
*H04W 72/12* (2009.01)
*H04W 88/04* (2009.01)

(52) U.S. Cl.
CPC ......... *H04W 72/02* (2013.01); *H04W 72/048* (2013.01); *H04W 72/0413* (2013.01); *H04W 72/0446* (2013.01); *H04W 72/1284* (2013.01); *H04W 88/04* (2013.01)

(58) Field of Classification Search
CPC ............ H04W 72/02; H04W 72/0413; H04W 72/1284; H04W 72/048; H04W 72/0446
See application file for complete search history.

(56) References Cited

U.S. PATENT DOCUMENTS 8,599,741 B2 * 12/2013 Tao ................. H04L 69/324
370/312
2010/0232546 A1 * 9/2010 Yu ................. H04W 72/0413
375/300

FOREIGN PATENT DOCUMENTS

| CN | 105657783 A | 6/2016 |
| CN | 105846882 A | 8/2016 |
| CN | 105992364 A | 10/2016 |

(Continued)

OTHER PUBLICATIONS

Extended EP Search Report for EP 16923238.6 dated Oct. 24, 2019.
(Continued)

*Primary Examiner* — Jamal Javaid (57) ABSTRACT

A data processing method and device are provided. The method includes: a receiving end acquires data to be processed, determines whether the data to be processed is relay data according to at least one of: information borne in the data to be processed, information borne in a message for applying for a resource for the data to be processed, information of a resource occupied by the message for applying for the resource for the data to be processed, and information needed for acquiring the data to be processed, and performs an operation on the data to be processed according to whether the data to be processed is the relay data.

19 Claims, 5 Drawing Sheets

(56) References Cited

FOREIGN PATENT DOCUMENTS

| WO | 2010034349 A1 | 4/2010 |
| WO | 2014092497 A1 | 6/2014 |
| WO | 2016017373 A1 | 2/2016 |

OTHER PUBLICATIONS

3GPP TSG RAN2 Meeting #95bis R2-166188.
S3GPP TSG RAN WG2 Meeting #95bis XP051151350.
3GPP TSG RAN2 Meeting #96; XP051177393.
3GPP TSG RAN WG2 #96; XP051177627.
3GPP TSG RAN WG2 #96 XP051177877.
3GPP TSG RAN WG2 #96; XP051178002.
Japan Office Action with English Translation for JP Application 2019-530393 dated Jan. 25, 2021.

\* cited by examiner

DATA PROCESSING METHOD AND DEVICE

CROSS-REFERENCE TO RELATED APPLICATION(S)

This application is a 371 application of International Application No. PCT/CN2016/108895, filed on Dec. 7, 2016, the entire disclosure of which is hereby incorporated by reference.

TECHNICAL FIELD

The present application relates to the communication field, and more particularly, to a data processing method and device.

BACKGROUND

The device-to-device (D2D) technology means that terminal devices in vicinity may transmit data through a direct link within a short distance range.

Data transmission between a network device and a remote terminal device may be assisted by a D2D relay. In such a situation, a D2D communication mode may be used between a terminal device used as a D2D relay and the remote terminal device, while a cellular communication mode may be used between the terminal device used as the D2D relay and the network device. Herein, the terminal device used for assisting the network device to communicate with the remote terminal device may be called as a relay terminal device, and the relay terminal device may also directly communicate with the network device without assisting other terminal devices.

For the network device or the relay terminal device, how to accurately identify whether acquired data is relay data is an urgent problem to be solved.

SUMMARY

Implementations of the present application provide a data processing method and device.

In a first aspect, a data processing method is provided. The data processing method includes: acquiring, by a receiving end, data to be processed; determining whether the data to be processed is relay data according to at least one of: information borne in the data to be processed, information borne in a message for applying for a resource for the data to be processed, information of a resource occupied by the message for applying for the resource for the data to be processed, and information needed for acquiring the data to be processed; and performing an operation on the data to be processed according to whether the data to be processed is the relay data.

Optionally, determining whether the data to be processed is the relay data according to the information borne in the data to be processed includes: determining whether the data to be processed is the relay data according to data in a physical layer of the data to be processed, information borne by a Protocol Data Unit (PDU) in a Media Access Control (MAC) layer, information borne by a PDU in a Radio Link Control (RLC) layer, or information borne by a PDU in an adaptation layer.

Optionally, determining whether the data to be processed is the relay data according to the information borne in the data to be processed includes: when a relay information indication field included in the data to be processed indicates that the data to be processed is the relay data, determining that the data to be processed is the relay data; or, when identification information of a remote terminal is carried in the adaptation layer of the data to be processed, determining that the data to be processed is the relay data; or, when bearer identification information is carried in the adaptation layer of the data to be processed, determining that the data to be processed is the relay data; or, when specific bearer identification information is carried in the adaptation layer of the data to be processed, determining that the data to be processed is the relay data.

Optionally, the relay information indication field is carried in a physical layer control channel or a physical layer traffic channel.

Optionally, the relay information indication field is carried in Downlink Control Information (DCI) or Uplink Control Information (UCI) transmitted through a physical control channel; or, the relay information indication field is carried at a front end of physical traffic channel data in the physical layer traffic channel.

Optionally, determining whether the data to be processed is the relay data according to the information borne in the message for applying for the resource for the data to be processed includes: determining whether the data to be processed is the relay data according to information carried in a Buffer Status Report (BSR) used for applying for the resource for the data to be processed.

Optionally, determining whether the data to be processed is the relay data according to the information carried in the BSR used for applying for the resource for the data to be processed includes: when relay data indication information indicating that the resource applied for is used for the relay data, identification information of a remote terminal, or relay-specific logical channel information is carried in the BSR, determining that the data to be processed is the relay data.

Optionally, determining whether the data to be processed is the relay data according to the information of the resource occupied by the message for applying for the resource for the data to be processed includes: determining whether the data to be processed is the relay data according to at least one of a time domain resource, a frequency domain resource, a code domain resource, and a power resource occupied by a scheduling request for applying for the resource for the data to be processed.

Optionally, determining whether the data to be processed is the relay data according to at least one of the time domain resource, the frequency domain resource, the code domain resource, and the power resource occupied by the scheduling request for applying for the resource for the data to be processed includes: when the time domain resource occupied by the scheduling request is a relay-specific time domain resource, and/or the frequency domain resource occupied by the scheduling request is a relay-specific frequency domain resource, and/or the code domain resource occupied by the scheduling request is a relay-specific code domain resource, and/or an airspace resource occupied by the scheduling request is a relay-specific airspace resource, and/or the power resource occupied by the scheduling request is a relay-specific power resource, determining that the data to be processed is the relay data.

Optionally, determining whether the data to be processed is the relay data according to the information needed for acquiring the data to be processed includes: determining whether the data to be processed is the relay data according to a Cell Radio Network Temporary Identity (C-RNTI) used for acquiring the data to be processed.

Optionally, determining whether the data to be processed is the relay data according to the C-RNTI for acquiring the data to be processed includes: when the C-RNTI used for acquiring the data to be processed is a relay-specific C-RNTI, determining that the data to be processed is the relay data.

Optionally, the receiving end is a relay terminal device, and performing the operation on the data to be processed according to whether the data to be processed is the relay data includes: before the data to be processed is delivered to the adaptation layer for processing, when the data to be processed is determined to be the relay data, delivering the data to be processed to the adaptation layer for processing, and relaying the data which has been processed by the adaptation layer to a remote terminal or a network device; or after the data to be processed is delivered to the adaptation layer for processing, when the data to be processed is identified as the relay data, delaying the data to the remote terminal or the network device.

Optionally, the receiving end is a network device, and performing the operation on the data to be processed according to whether the data to be processed is the relay data includes: before the data to be processed is delivered to the adaptation layer for processing, when the data to be processed is determined to be the relay data, delivering the data to be processed to the adaptation layer for processing, and delivering the data which has been processed by the adaptation layer to a Packet Data Convergence Protocol (PDCP) layer for processing; or after the data to be processed is delivered to the adaptation layer for processing, when the data to be processed is identified as the relay data, delivering the data to be processed to the PDCP layer for processing.

Optionally, performing the operation on the data to be processed according to whether the data to be processed is the relay data includes: when the data to be processed is not relay data, delivering the data to be processed to the PDCP layer for processing.

Optionally, the data to be processed belongs to a Layer 2 packet.

In a second aspect, a data processing device is provided. The data processing device may include units that perform the method of the first aspect or the method in any one of optional implementations of the first aspect.

In a third aspect, a data processing device is provided. The data processing device includes a processor and a storage. The storage is used for storing program codes, and the processor is used for calling the program codes stored in the storage to execute the method of the first aspect or the methods in various implementations of the first aspect.

In a fourth aspect, a computer readable medium is provided. The computer readable medium stores program codes executable by a terminal device, and the program codes include instructions for executing the method of the first aspect or the method in any one of the various implementations of the first aspect.

BRIEF DESCRIPTION OF DRAWINGS

To describe technical schemes of implementations of the present application more clearly, accompanying drawings to be used in the description of implementations or existing art will be briefly introduced below. It is apparent that the accompanying drawings described below are only some implementations of the present application; and for a person of ordinary skill in the art, other drawings may be obtained according to these drawings without creative efforts.

DETAILED DESCRIPTION

The technical schemes in implementations of the present application will be described clearly and completely below with reference to the drawings in the implementations of the present application. It is apparent that the implementations described are just some implementations of the present application, but not all implementations of the present application. According to the implementations of the present application, all other implementations acquired by a person of ordinary skill in the art without creative efforts are within the protection scope of the present application.

In addition, the terms "system" and "network" are often used interchangeably herein. The term "and/or" in this document is merely an association relationship describing associated objects, indicating that there may be three relationships, for example, A and/or B may indicate three situations: A alone, A and B, and B alone. In addition, the symbol "/" in this document generally indicates that objects of the former and the latter connected by "/" has an "or" relationship.

Figure 1:
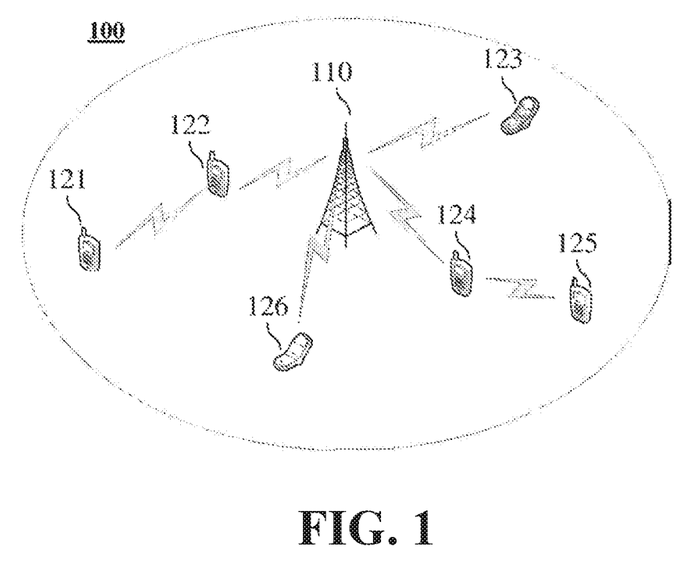
FIG. 1 is a schematic diagram of a wireless communication system according to an implementation of the present application.

FIG. 1 is a schematic diagram of a wireless communication system 100 to which implementations of the present application are applicable. The wireless communication system 100 includes at least one network device 110. The network device 110 may be a device that communicates with a terminal device. Each network device 110 may provide communication coverage for a specific geographic area, and may communicate with terminal devices located within the coverage area. The network device 100 may be a Base Transceiver Station (BTS) in a GSM system or CDMA (Code Division Multiple Access) system, a NodeB (NB) in a WCDMA system, an Evolutional Node B (eNB or eNodeB) in an LTE system, or a radio controller in a Cloud Radio Access Network (CRAN). Or, the network device may be a relay station, an access point, an on-board device, or a wearable device, a network device in a future 5G network, or a network device in a future evolved Public Land Mobile Network (PLMN), etc.

The wireless communication system 100 also includes a plurality of terminal devices, for example, terminal devices 121, 122, 123, 124, 125 and 126 as shown in FIG. 1. The terminal devices may be mobile or fixed. The terminal device may be referred to an access terminal, User Equipment (UE), a subscriber unit, a subscriber station, a mobile station, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, an on-board device, a wearable device, a terminal device in a future 5G network, or a terminal device in a future evolved Public Land Mobile Network (PLMN), or the like.

FIG. 1 exemplifies one network device and six terminal devices. Optionally, the wireless communication system 100 may include a plurality of network devices and another quantity of terminal devices, and implementations of the present application are not limited thereto. In addition, the wireless communication system 100 may also include other network entities, such as a Mobile Management Entity (MME), a Serving Gateway (S-GW), a Packet Data Network Gateway (P-GW), and implementations of the present application are not limited thereto.

Specifically, the terminal device may communicate in a cellular communication mode or a D2D communication mode. In the cellular communication mode, the terminal device may communicate with other terminal devices through the network device. In the D2D communication mode, the terminal device may directly communicate with other terminal devices through D2D links.

Among the plurality of terminal devices shown in FIG. 1, the terminal device 121 and the terminal device 125 may be referred to as remote terminal devices. The terminal device 121 and the terminal device 125 may communicate with the network device 110 through relay terminal devices 122 and 124, respectively. The terminal device 122 and the terminal device 124 may respectively relay data between the remote terminal device 121 and the network device 110 and relay data between and the remote terminal device 125 and the network device 110. In this case, the terminal device 122 and the terminal device 124 may be referred to as relay terminal devices. The relay terminal devices 122 and 124 may directly communicate with the network device without assisting other terminal devices. The terminal device 123 may communicate with the network device 110 neither through the relay terminal device, nor relaying communication between another terminal device and the network 110.

The terminal devices 122, 123, 124 and 126 have Uu interfaces with the network device 110, and may communicate with the network device 110 by using a cellular communication technology. There is a PC5 interface between the relay terminal device and the remote terminal device, and a D2D communication technology is used for communication between the relay terminal device and the remote terminal device. The D2D communication technology may be specifically a SideLink (SL) technology in the LTE, a WiFi or Bluetooth technology etc., in the WLAN, or other D2D communication technologies, and the implementations of the present application are not limited thereto. The terminal device 121 and the terminal device 125 may directly communicate with the network device 110 without the relay terminal device, and in this case, the terminal device 121 and the terminal device 125 have Uu interfaces with the network device, and may communicate with the network device 110 by using the cellular communication technology.

In an implementation of the present application, data may be transmitted between the relay terminal device and the remote terminal device via Layer 2 relay. In this case, a Layer 2 PDU (such as MAC PDU, RLC PDU or PDCP PDU) may be used for relay transmission in both the Uu interface and the PC5 interface.

Figure 2A:
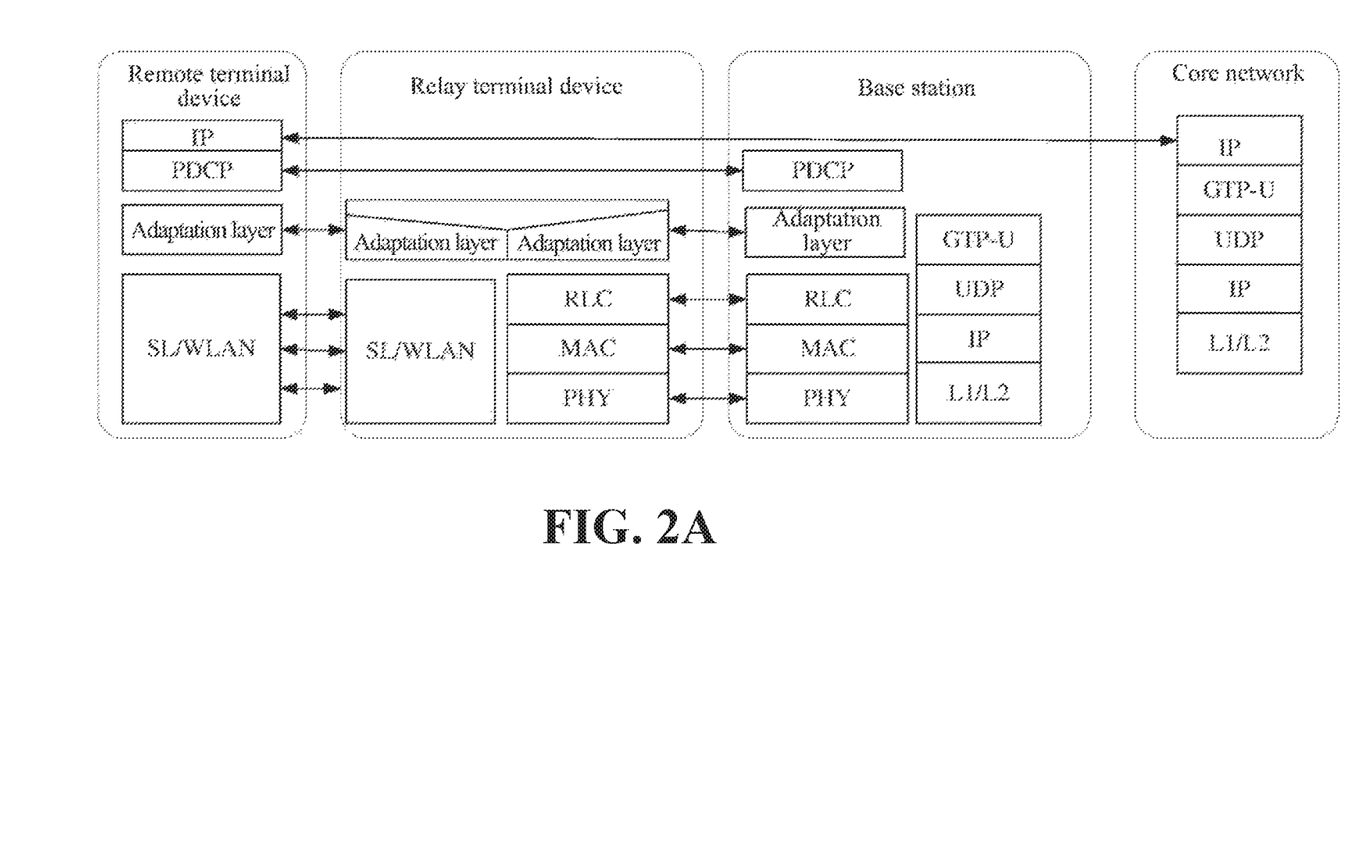
FIGS. 2a and 2b are schematic diagrams of protocol stacks according to an implementation of the present application.
Figure 2B:
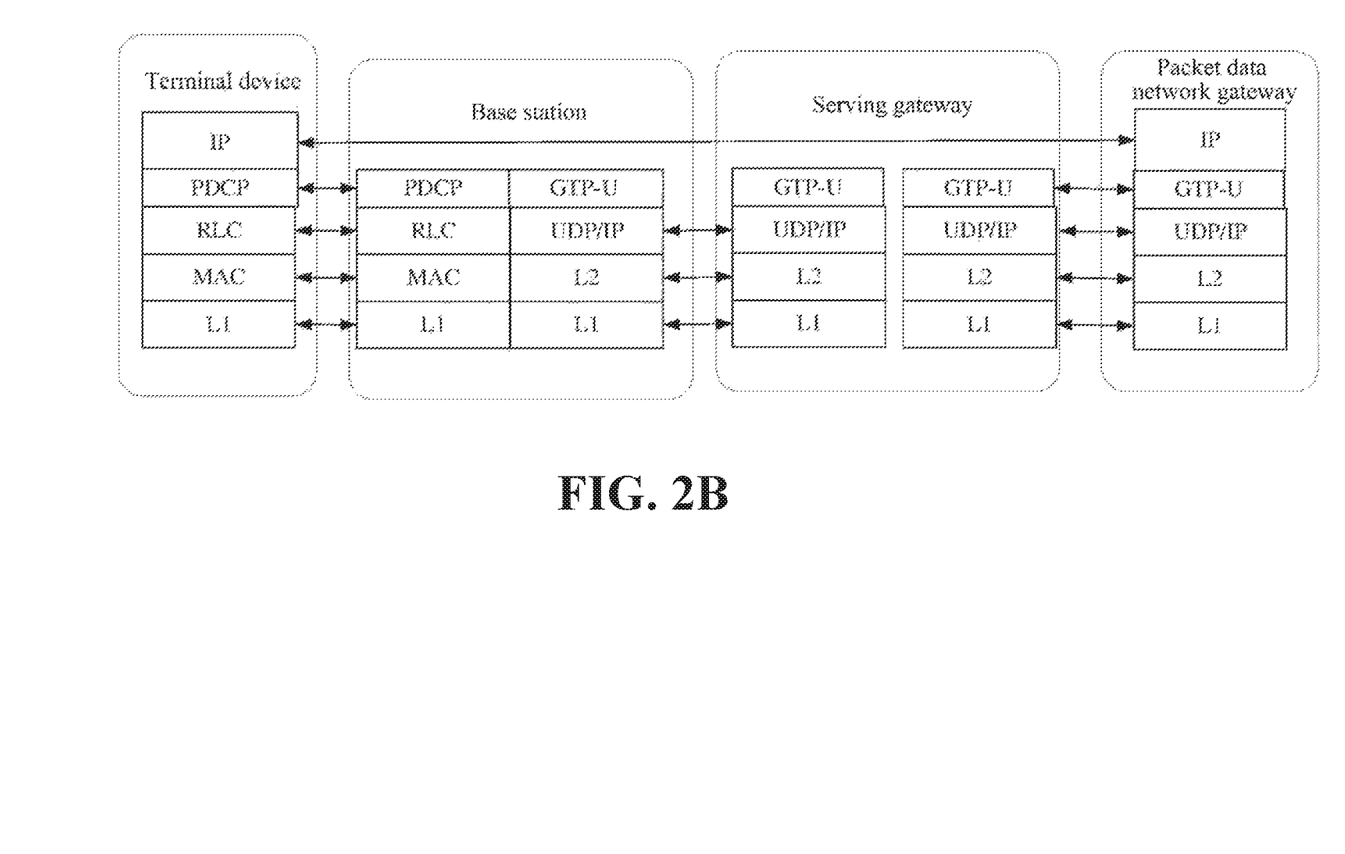

FIG. 2a shows a protocol stack among a remote terminal device, a relay terminal device, a base station, and a core network for transmitting data. FIG. 2b shows a protocol stack used for transmitting user plane data among a terminal device, a base station, a serving gateway, and a packet data network gateway.

As shown in FIG. 2a, Layer 2 of the remote terminal device, Layer 2 of the relay terminal device, and Layer 2 of the network device have an adaptation layer, respectively. When transmitting relay data, the remote terminal device and the relay terminal device may transmit packets processed through the adaptation layer and lower layers corresponding to the D2D communication technology. If the D2D communication technology is specifically the SideLink technology of the LTE, the lower layers may specifically be a MAC layer and a physical (PHY) layer. If the D2D communication technology is another communication technology, such as a Bluetooth or WiFi technology, the lower layers may be layers corresponding to the MAC layer and the physical layer in the another communication technology. Packets processed by the PHY layer, the MAC layer, the RLC layer and the adaptation layer may be transmitted between the relay terminal device and the base station. When the remote terminal device communicates directly with the base station, packets processed by the PDCP layer may be transmitted. When the remote terminal device communicates with the core network, packets processed by an Internal Protocol (IP) layer may be transmitted.

Optionally, the adaptation layer may be located between the RLC layer and the PDCP layer, which is not limited by the implementations of the present application.

As shown in FIG. 2b, packets processed through the Layer 1 (L1), the MAC layer, the RLC layer and the PDCP layer may be transmitted between the terminal device and the base station, and packets processed through the L1, Layer 2 (L2), the User Datagram Protocol (UDP)/IP layer and the GTP-U layer may be transmitted between the base station and the serving gateway. Packets processed through the L1, the L2, the UDP/IP layer (UDP is the User Datagram Protocol), and GTP-U (GPRS (General Packet Radio Service) Tunnelling Protocol for the user plane) layer may be transmitted between the serving gateway and the packet data network gateway.

From the above description, it can be seen that the processing performed by the terminal device serving as the relay terminal device to communicate with the network device and the remote terminal device is different from the processing performed by the terminal device not serving as a relay terminal device to communicate with the network device. And the operation of the network device for processing the relay data is different from the operation of the network device for processing the data which is not relay data. Therefore, an implementation of the present application provides a data processing method in which a relay terminal device and a network device can identify whether acquired data is relay data, and perform a corresponding operation according to whether the data is relay data.

Figure 3:
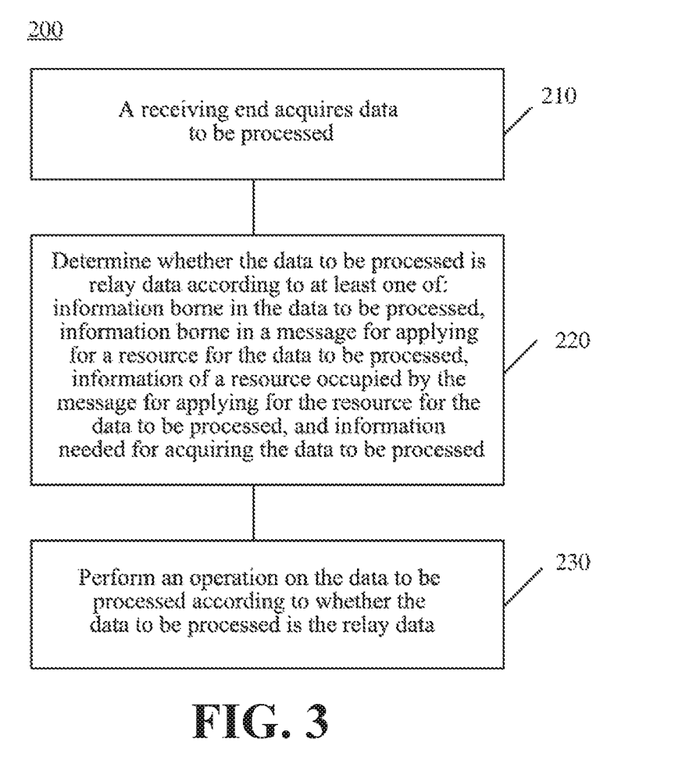
FIG. 3 is a schematic flowchart of a data processing method according to an implementation of the present application.

FIG. 3 schematically shows a data processing method 200 provided by an implementation of the present application. The method 200 may be applied to the wireless communication system 100 described above, and the implementations of the present application are not limited thereto.

As shown in FIG. 3, the method 200 includes the following contents.

In 210, a receiving end acquires data to be processed.

Specifically, the method 200 may be applied to relay transmission of uplink data, that is, a remote terminal device transmits uplink data to a network device through a relay terminal device. In this case, a sending end device is specifically a remote terminal device, and a receiving end may be the relay terminal device or the network device. Optionally, the method 200 may be applied to relay transmission of downlink data, that is, the network device transmits downlink data to the remote terminal device through the relay terminal device. In this case, the sending end device is the network device, and the receiving end may be the relay terminal device, and the implementations of the present application are not limited thereto.

Optionally, the data to be processed belongs to a Layer 2 encapsulation packet.

In 220, whether the data to be processed is relay data is determined according to at least one of the following: information borne in the data to be processed, information borne in a message for applying for a resource for the data to be processed, information of a resource occupied by the message for applying for the resource for the data to be processed, and information needed for acquiring the data to be processed.

Optionally, whether the data to be processed is the relay data is determined according to data in a physical layer of the data to be processed, information borne by a PDU in a MAC layer, information borne by a PDU in an RLC layer, or information borne by a PDU in an adaptation layer.

Optionally, whether the data to be processed is the relay data may be determined according to information borne in the data to be processed. Herein, whether the data to be processed is the relay data may be determined only according to the information borne in the data to be processed, or, in combination with other information, for example, the information for acquiring the data to be processed.

In an implementation, when a relay information indication field included in the data to be processed indicates that the data to be processed is relay data, the data to be processed is determined to be the relay data.

Optionally, the relay information indication field is borne in a physical layer control channel or a physical layer traffic channel.

Optionally, the relay information indication field is borne in DCI or UCI transmitted through a physical control channel; or, the relay information indication field is borne at a front end of physical traffic channel data in a physical layer traffic channel. The front end may refer to a front portion of the physical traffic channel data in a time domain.

Optionally, the relay information indication field may be a 1-bit field, for example, 1 may represent that the data to be processed is the relay data, and 0 may represent that the data to be processed is not relay data.

In an implementation, when identification information of a remote terminal is carried in the adaptation layer of the data to be processed, the data to be processed is determined to be the relay data.

In an implementation, when bearer identification information is carried in the adaptation layer of the data to be processed, the data to be processed is determined to be the relay data.

In an implementation, when specific bearer identification information is carried in the adaptation layer of the data to be processed, the data to be processed is determined to be the relay data.

Optionally, the specific bearer identification information may be specified by a protocol, or configured by the network device.

Optionally, whether the data to be processed is the relay data is determined according to information carried in a Buffer State Report (BSR) used for applying for the resource for the data to be processed. Identifying the relay data may be performed by only utilizing the information carried in the BSR used for applying for the resource for the data to be processed, or, other information, such as information borne in the data to be processed, may be used in combination with the BSR to identify the relay data.

Optionally, when relay data indication information indicating that the resource applied for is used for relay data, identification information of a remote terminal, or relay-specific logical channel information is carried in the BSR, the data to be processed is determined to be the relay data.

Specifically, the BSR may have a relay data indication field. If the information carried in the relay data indication field is used for indicating that the resource applied for is used for the relay data, the data to be processed corresponding to the BSR is determined to be the relay data. The relay data indication field may be a 1-bit field, for example, 1 may represent that the resource applied for is used for the relay data, and 0 may represent that the resource applied for is used for the data which is not relay data.

Optionally, whether the data to be processed is the relay data is determined according to at least one of a time domain resource, a frequency domain resource, a code domain resource (e.g., a preamble) and a power resource (e.g., a receiving power interval) occupied by a scheduling request for applying for the resource for the data to be processed. The relay data may be identified only according to the information of the resource occupied by the scheduling request for applying for the resource for the data to be processed, or the relay data may be identified in combination with other information, which will not be specifically limited here.

Optionally, when the time domain resource occupied by the scheduling request is a relay-specific time domain resource, and/or the frequency domain resource occupied by the scheduling request is a relay-specific frequency domain resource, and/or the code domain resource occupied by the scheduling request is a relay-specific code domain resource, and/or an airspace resource occupied by the scheduling request is a relay specific airspace resource, and/or a power resource occupied by the scheduling request is a relay-specific power resource, it is determined that the data to be processed is the relay data.

Optionally, the relay-specific time domain resource, and/or the relay-specific frequency domain resource, and/or the relay-specific code domain resource, and/or the relay-specific airspace resource, and/or the relay-specific power resource may be specified by a protocol, or configured by the network device.

Optionally, the resource applied for by the scheduling request may be used for transmitting the BSR, and the BSR may carry an amount of the data to be processed and be used for applying for a particular transmission resource for the data to be processed.

Optionally, whether the data to be processed is the relay data is determined according to C-RNTI used for acquiring the data to be processed. The identification of the relay data may be performed only according to the C-RNTI, or in combination with other information, which will not be limited specifically here.

Optionally, when the C-RNTI used for acquiring the data to be processed is relay-specific C-RNTI, the data to be processed is determined to be the relay data.

Optionally, the relay-specific C-RNTI may be specified by a protocol, or configured by the network device.

Optionally, in implementations of the present application, the relay data is determined by utilizing the identification information of a remote terminal carried in the adaptation layer in the data to be processed, the bearer identification information in the adaptation layer, the information of the resource occupied by a message for applying for the resource for the data to be processed, and/or the information needed for acquiring the data to be processed, which may be referred to as indicating whether the data is the relay data implicitly, so that no special relay data indication resource is needed, thereby the resource overhead can be reduced.

In 230, an operation is performed on the data to be processed according to whether the data to be processed is the relay data.

Optionally, the receiving end is a relay terminal device. Before the relay terminal device delivers the data to be processed to the adaptation layer for processing, when the data to be processed is determined as the relay data, the relay terminal device delivers the data to be processed to the adaptation layer for processing, and relays the data which has been processed by the adaptation layer to a remote terminal or the network device.

Optionally, the receiving end is a relay terminal device. After the relay terminal device delivers the data to be processed to the adaptation layer for processing, when the data to be processed is identified as the relay data, the relay terminal device relays the data to a remote terminal or the network device Optionally, the receiving end is a network device. Before the network device delivers the data to be processed to the adaptation layer for processing, when the data to be processed is determined as the relay data, the network device delivers the data to be processed to the adaptation layer for processing, and delivers the data which has been processed by the adaptation layer to the PDCP layer for processing.

Optionally, the receiving end is a network device. After the network device delivers the data to be processed to the adaptation layer for processing, when the data to be processed is identified as the relay data, the network device delivers the data to be processed to the PDCP layer for processing.

Optionally, when the data to be processed is not relay data, the data to be processed is delivered to the PDCP layer for processing, and in this case, the receiving end may be the network device, or the relay terminal device.

Therefore, in the implementations of the present application, whether the data to be processed is the relay data is determined according to at least one of the following: information borne in the data to be processed, information borne in a message for applying for the resource for the data to be processed, information of the resource occupied by the message for applying for the resource for the data to be processed, and information needed for acquiring the data to be processed. Therefore, an operation may be performed on the data to be processed according to whether the data to be processed is the relay data.

Figure 4:
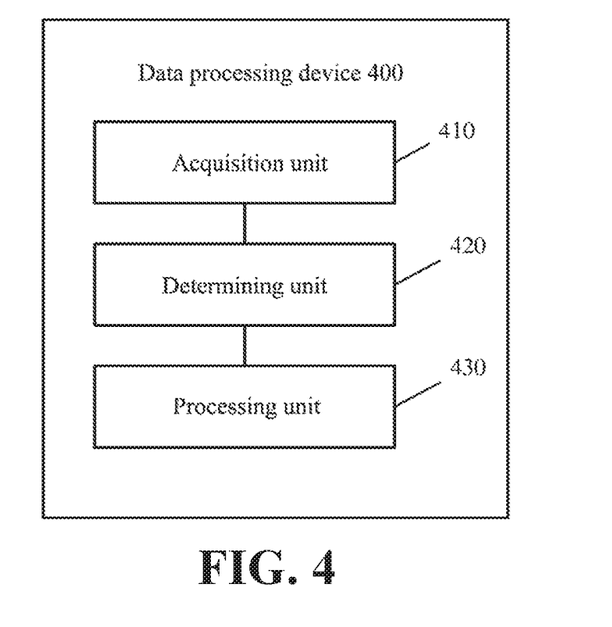
FIG. 4 is a schematic block diagram of a data processing device according to an implementation of the present application.

FIG. 4 is a schematic block diagram of a data processing device 400 according to an implementation of the present application. As shown in FIG. 4, the data processing device 400 includes an acquisition unit 410, a determining unit 420, and a processing unit 430.

The acquisition unit 410 is used for acquiring data to be processed. The determining unit 420 is used for determining whether the data to be processed is relay data according to at least one of: information borne in the data to be processed, information borne in a message for applying for a resource for the data to be processed, information of a resource occupied by the message for applying for the resource for the data to be processed, and information needed for acquiring the data to be processed. The processing unit 430 is used for performing an operation on the data to be processed according to whether the data to be processed is the relay data.

Optionally, the determining unit 420 is specifically used for determining whether the data to be processed is the relay data according to data in a physical layer of the data to be processed, information borne by a PDU in a MAC layer, information borne by a PDU in an RLC layer, or information borne by a PDU in an adaptation layer.

Optionally, the determining unit 420 is specifically used for determining that the data to be processed is the relay data when a relay information indication field included in the data to be processed indicates that the data to be processed is the relay data; or, determining that the data to be processed is the relay data when identification information of a remote terminal is carried in the adaptation layer of the data to be processed; or, determining that the data to be processed is the relay data when bearer identification information is carried in the adaptation layer of the data to be processed; or, determining that the data to be processed is the relay data when specific bearer identification information is carried in the adaptation layer of the data to be processed.

Optionally, the relay information indication field is carried in a physical layer control channel or a physical layer traffic channel.

Optionally, the relay information indication field is carried in Downlink Control Information (DCI) or Uplink Control Information (UCI) transmitted through a physical control channel; or, the relay information indication field is carried at a front end of physical traffic channel data in the physical layer traffic channel.

Optionally, the determining unit 420 is specifically used for determining whether the data to be processed is the relay data according to information carried in a Buffer Status Report (BSR) used for applying for the resource for the data to be processed.

Optionally, the determining unit 420 is specifically used for determining that the data to be processed is the relay data when relay data indication information indicating that the resource applied for is used for relay data, identification information of a remote terminal, or relay-specific logical channel information is carried in the BSR.

Optionally, the determining unit 420 is specifically used for determining whether the data to be processed is the relay data according to at least one of a time domain resource, a frequency domain resource, a code domain resource, and a power resource occupied by a scheduling request for applying for the resource for the data to be processed.

Optionally, the determining unit 420 is specifically used for determining that the data to be processed is the relay data when the time domain resource occupied by the scheduling request is a relay-specific time domain resource, and/or the frequency domain resource occupied by the scheduling request is a relay-specific frequency domain resource, and/or the code domain resource occupied by the scheduling request is a relay-specific code domain resource, and/or an airspace resource occupied by the scheduling request is a relay-specific airspace resource, and/or the power resource occupied by the scheduling request is a relay-specific power resource.

Optionally, the determining unit 420 is specifically used for determining whether the data to be processed is the relay data according to a Cell Radio Network Temporary Identity (C-RNTI) used for acquiring the data to be processed.

Optionally, the determining unit 420 is specifically used for determining that the data to be processed is the relay data when the C-RNTI used for acquiring the data to be processed is a relay-specific C-RNTI.

Optionally, the data processing device 400 is a relay terminal device, and the processing unit 430 is specifically used for, before the data to be processed is delivered to the adaptation layer for processing, when the data to be processed is determined to be the relay data, delivering the data to be processed to the adaptation layer for processing, and relaying the data to be processed which has been processed by the adaptation layer to a remote terminal or the network device; or, after the data to be processed is delivered to the adaptation layer for processing, when the data to be processed is identified as the relay data, relaying the data to the remote terminal or the network device.

Optionally, the data processing device 400 is a network device, and the processing unit 430 is specifically used for, before the data to be processed is delivered to the adaptation layer for processing, when the data to be processed is determined to be the relay data, delivering the data to be processed to the adaptation layer for processing, and relaying the data which has been processed by the adaptation layer to a PDCP layer; or, after the data to be processed is delivered to the adaptation layer for processing, when the data to be processed is identified as the relay data, delivering the data to be processed to the PDCP layer for processing.

Optionally, the processing unit 430 is specifically used for, when the data to be processed is not relay data, delivering the data to be processed to the PDCP layer for processing.

Optionally, the data to be processed belongs to a Layer 2 packet.

It should be understood that the data processing device 400 may implement the method 300 shown in FIG. 3, which will not be described here repeatedly for brevity.

Figure 5:
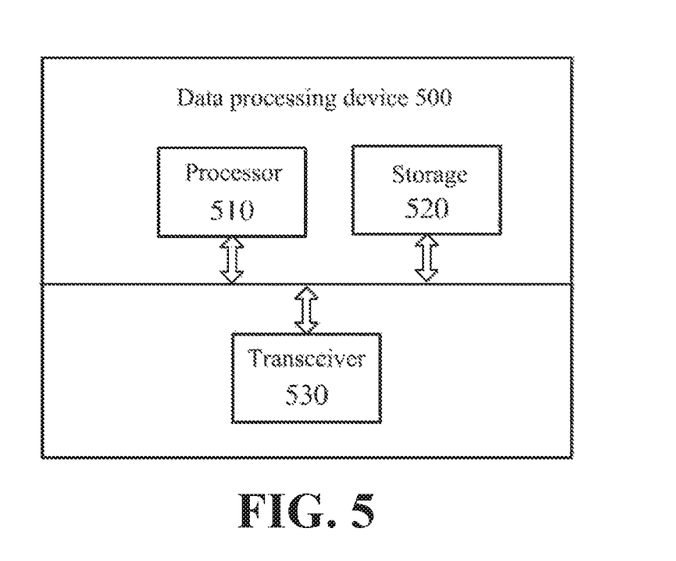
FIG. 5 is a schematic block diagram of a data processing device according to an implementation of the present application.

FIG. 5 is a schematic block diagram of a data processing device 500 according to an implementation of the present application. As shown in FIG. 5, the device 500 may include a processor 510 and a storage 520. The storage 520 may store program codes, and the processor 510 may execute the program codes stored in the storage 520.

Optionally, as shown in FIG. 5, the device 500 may include a transceiver 530, and the processor 510 may communicate with the external through the transceiver 530.

Optionally, the processor 510 may call the program codes stored in the storage 520 to perform corresponding operations in the method 300 shown in FIG. 3, which will not be described here repeatedly for brevity.

Optionally, the device 500 may be a terminal device, or a system chip that may be arranged in the terminal device. The device 500 may be a network device, or a system chip that may be arranged in the network device.

Those of ordinary skill in the art will recognize that the exemplary elements and algorithm acts described in connection with the implementations disclosed herein can be implemented in electronic hardware, or a combination of computer software and electronic hardware. Whether these functions are implemented in hardware or software depends on the specific application and design constraints of the technical solution. Skilled artisans may use different methods to implement the described functions in respect to each particular application, but such implementation should not be considered to be beyond the scope of the present invention.

Those skilled in the art can clearly understand that for convenience and conciseness of description, the specific working processes of the system, device and unit described above may refer to the corresponding processes in the aforementioned method implementations and will not be described here.

In several implementations provided by the present invention, it should be understood that the disclosed systems, devices and methods may be implemented in other ways. For example, the device implementations described above are only illustrative, for example, the division of the units is only a logical function division, and there may be other division manners in actual implementation, for example, multiple units or components may be combined or integrated into another system, or some features may be ignored or not executed. On the other hand, the mutual coupling or direct coupling or communication connection shown or discussed may be indirect coupling or communication connection through some interface, device or unit, and may be in electrical, mechanical or other forms.

The unit described as a separate unit may or may not be physically separated, and the component shown as a unit may or may not be a physical unit, i.e., it may be located in one place or may be distributed over multiple network units. Some or all of the elements can be selected according to actual needs to achieve the purpose of the implementations.

In addition, various functional units in various implementations of the present application may be integrated in one processing unit, or the various units may be physically present separately, or two or more units may be integrated in one unit.

The functions may be stored in a computer readable storage medium if implemented in the form of software functional units and sold or used as a separate product. Based on this understanding, the technical solution of the present application, in essence, or the part contributing to the prior art, or the part of the technical solution, may be embodied in the form of a software product stored in a storage medium, including a number of instructions for causing a computer device (which may be a personal computer, a server, or a network device) to perform all or part of the acts of the method described in various implementations of the present application. The aforementioned storage media include U disk, mobile hard disk, read-only memory, random access memory, magnetic disk or optical disk, and other media capable of storing program codes.

What are described above are merely exemplary implementations of the present application, but the protection scope of the present application is not limited thereto. Any change or substation that can be easily conceived by a person skilled in the art within the technical scope disclosed by the present application shall be included within the protection scope of the present application. Therefore, the protection scope of the present application shall be the protection scope defined by the claims.

What is claimed is:

1. A data processing method, comprising:
   acquiring, by a receiving end, data to be processed;
   determining whether the data to be processed is relay data according to at least one of: information borne in the data to be processed, information borne in a message for applying for a resource for the data to be processed, information of a resource occupied by the message for applying for the resource for the data to be processed, and information needed for acquiring the data to be processed; and
   performing an operation on the data to be processed according to whether the data to be processed is the relay data; wherein performing the operation on the data to be processed according to whether the data to be processed is the relay data comprises:
when the data to be processed is not relay data, delivering the data to be processed to a Packet Data Convergence Protocol (PDCP) layer for processing.

2. The method according to claim 1, wherein determining whether the data to be processed is the relay data according to the information borne in the data to be processed comprises:
determining whether the data to be processed is the relay data according to data in a physical layer of the data to be processed, information borne by a Protocol Data Unit (PDU) in a Media Access Control (MAC) layer, information borne by a PDU in a Radio Link Control (RLC) layer, or information borne by a PDU in an adaptation layer.

3. The method according to claim 1, wherein determining whether the data to be processed is the relay data according to the information borne in the data to be processed comprises:
when a relay information indication field included in the data to be processed indicates that the data to be processed is the relay data, determining that the data to be processed is the relay data; or
when identification information of a remote terminal is carried in an adaptation layer of the data to be processed, determining that the data to be processed is the relay data; or
when bearer identification information is carried in the adaptation layer of the data to be processed, determining that the data to be processed is the relay data; or
when specific bearer identification information is carried in the adaptation layer of the data to be processed, determining that the data to be processed is the relay data.

4. The method according to claim 3, wherein the relay information indication field is borne in a physical layer control channel or a physical layer traffic channel.

5. The method according to claim 4, wherein the relay information indication field is borne in Downlink Control Information (DCI) or Uplink Control Information (UCI) transmitted through a physical control channel; or
the relay information indication field is borne at a front end of physical traffic channel data in the physical layer traffic channel.

6. The method according to claim 1, wherein determining whether the data to be processed is the relay data according to the information borne in the message for applying for the resource for the data to be processed comprises:
determining whether the data to be processed is the relay data according to information carried in a Buffer Status Report (BSR) used for applying for the resource for the data to be processed.

7. The method according to claim 6, wherein determining whether the data to be processed is the relay data according to the information carried in the BSR used for applying for the resource for the data to be processed comprises:
when relay data indication information indicating that the resource applied for is used for the relay data, identification information of a remote terminal, or relay-specific logical channel information is carried in the BSR, determining that the data to be processed is the relay data.

8. The method according to claim 1, wherein determining whether the data to be processed is the relay data according to the information of the resource occupied by the message for applying for the resource for the data to be processed comprises:
determining whether the data to be processed is the relay data according to at least one of a time domain resource, a frequency domain resource, a code domain resource, and a power resource occupied by a scheduling request for applying for the resource for the data to be processed.

9. The method according to claim 8, wherein determining whether the data to be processed is the relay data according to at least one of the time domain resource, the frequency domain resource, the code domain resource, and the power resource occupied by the scheduling request for applying for the resource for the data to be processed comprises at least one of:
determining that the data to be processed is the relay data when the time domain resource occupied by the scheduling request is a relay-specific time domain resource,
determining that the data to be processed is the relay data when the frequency domain resource occupied by the scheduling request is a relay-specific frequency domain resource,
determining that the data to be processed is the relay data when the code domain resource occupied by the scheduling request is a relay-specific code domain resource,
determining that the data to be processed is the relay data when an airspace resource occupied by the scheduling request is a relay-specific airspace resource, or
determining that the data to be processed is the relay data when the power resource occupied by the scheduling request is a relay-specific power resource.

10. The method according to claim 1, wherein determining whether the data to be processed is the relay data according to the information needed for acquiring the data to be processed comprises:
determining whether the data to be processed is the relay data according to a Cell Radio Network Temporary Identity(C-RNTI) used for acquiring the data to be processed.

11. The method according to claim 10, wherein determining whether the data to be processed is the relay data according to the C-RNTI used for acquiring the data to be processed comprises:
when the C-RNTI used for acquiring the data to be processed is a relay-specific C-RNTI, determining that the data to be processed is the relay data.

12. The method according to claim 1, wherein the receiving end is a relay terminal device, and performing the operation on the data to be processed according to whether the data to be processed is the relay data comprises:
before the data to be processed is delivered to an adaptation layer for processing, when the data to be processed is determined to be the relay data, delivering the data to be processed to the adaptation layer for processing, and relaying the data which has been processed by the adaptation layer to a remote terminal or a network device; or
after the data to be processed is delivered to the adaptation layer for processing, when the data to be processed is identified as the relay data, relaying the data to the remote terminal or the network device.

13. The method according to claim 1, wherein the receiving end is a network device, and performing the operation on the data to be processed according to whether the data to be processed is the relay data comprises:

before the data to be processed is delivered to an adaptation layer for processing, when the data to be processed is determined to be the relay data, delivering the data to be processed to the adaptation layer for processing, and relaying the data which has been processed by the adaptation layer to a Packet Data Convergence Protocol (PDCP) layer for processing; or after the data to be processed is delivered to the adaptation layer for processing, when the data to be processed is identified as the relay data, delivering the data to be processed to the PDCP layer for processing.

14. The method according to claim 1, wherein the data to be processed belongs to a Layer 2 packet.

15. A data processing device, comprising:
a storage used for storing program codes;
a processor used for executing the program codes stored in the storage to perform acts of:
acquiring data to be processed;
determining whether the data to be processed is relay data according to at least one of: information borne in the data to be processed, information borne in a message for applying for a resource for the data to be processed, information of a resource occupied by the message for applying for the resource for the data to be processed, and information needed for acquiring the data to be processed; and
performing an operation on the data to be processed according to whether the data to be processed is the relay data; wherein performing the operation on the data to be processed according to whether the data to be processed is the relay data comprises:
when the data to be processed is not relay data, delivering the data to be processed to a Packet Data Convergence Protocol (PDCP) layer for processing.

16. The device according to claim 15, wherein the processor is further used for executing the program codes stored in the storage to perform an act of:
determining whether the data to be processed is the relay data according to data in a physical layer of the data to be processed, information borne by a Protocol Data Unit (PDU) in a Media Access Control (MAC) layer, information borne by a PDU in a Radio Link Control (RLC) layer, or information borne by a PDU in an adaptation layer.

17. The device according to claim 15, wherein the processor is further used for executing the program codes stored in the storage to perform an act of:
determining that the data to be processed is the relay data when a relay information indication field included in the data to be processed indicates that the data to be processed is the relay data; or, determining that the data to be processed is the relay data when identification information of a remote terminal is carried in an adaptation layer of the data to be processed; or, determining that the data to be processed is the relay data when bearer identification information is carried in the adaptation layer of the data to be processed; or, determining that the data to be processed is the relay data when specific bearer identification information is carried in the adaptation layer of the data to be processed.

18. The device according to claim 17, wherein the relay information indication field is carried in a physical layer control channel or a physical layer traffic channel.

19. A non-transitory computer readable medium, comprising: program codes executable by a terminal device; wherein the program codes include instructions, when executed by the terminal device, for executing acts of:
acquiring data to be processed;
determining whether the data to be processed is relay data according to at least one of: information borne in the data to be processed, information borne in a message for applying for a resource for the data to be processed, information of a resource occupied by the message for applying for the resource for the data to be processed, and information needed for acquiring the data to be processed; and
performing an operation on the data to be processed according to whether the data to be processed is the relay data; wherein performing the operation on the data to be processed according to whether the data to be processed is the relay data comprises:
when the data to be processed is not relay data, delivering the data to be processed to a Packet Data Convergence Protocol (PDCP) layer for processing.

* * * * *